US009437182B2

(12) United States Patent
Doclo

(10) Patent No.: US 9,437,182 B2
(45) Date of Patent: Sep. 6, 2016

(54) ACTIVE NOISE REDUCTION METHOD USING PERCEPTUAL MASKING

(75) Inventor: Simon Doclo, Schilde (BE)

(73) Assignee: NXP B.V., Eindhoven (NL)

( * ) Notice: Subject to any disclaimer, the term of this patent is extended or adjusted under 35 U.S.C. 154(b) by 1498 days.

(21) Appl. No.: 12/846,677

(22) Filed: Jul. 29, 2010

(65) Prior Publication Data

US 2011/0026724 A1 Feb. 3, 2011

(30) Foreign Application Priority Data

Jul. 30, 2009 (EP) .................................... 09166902

(51) Int. Cl.
*H04B 15/00* (2006.01)
*G10K 11/178* (2006.01)
*H04R 1/10* (2006.01)

(52) U.S. Cl.
CPC ........... *G10K 11/178* (2013.01); *H04R 1/1083* (2013.01); *G10K 2210/108* (2013.01); *G10K 2210/1053* (2013.01); *H04R 2460/01* (2013.01)

(58) Field of Classification Search
CPC ......... G10K 11/1788; G10K 11/1784; G10K 11/178; G10K 11/002; G10K 2210/1081; G10K 2210/30231; G10K 2210/30232; G10K 2210/511; G10K 2210/3012; G10K 2210/3022; G10K 2210/3028; G10K 2210/30351; G10K 2210/3055; H04R 3/005; H04R 25/407; H04R 2410/05; A61F 11/08; A61F 11/12; A61F 2011/145
USPC ........ 381/122, 103, 99, 98, 97, 96, 95, 94.8, 381/94.7, 94.5, 94.4, 94.3, 94.2, 94.1, 93, 381/94.9, 83, 80, 71.12, 71.11, 71.8, 71.1, 381/320, 317, 318, 316, 71.6; 704/200.1, 704/E19.001, E19.046; 455/570, 114.2, 455/63.1, 67.13, 136, 222, 296; 379/406.01–406.16; 700/94
See application file for complete search history.

(56) References Cited

U.S. PATENT DOCUMENTS

2008/0186218 A1 8/2008 Ohkuri et al.
2009/0074199 A1* 3/2009 Kierstein et al. ............ 381/71.6

FOREIGN PATENT DOCUMENTS

| | | | | |
|---|---|---|---|---|
| EP | 1770685 A1 | | 4/2007 | |
| GB | 2455822 A | * | 6/2009 | ........... G10K 11/178 |
| JP | 05011772 A | | 1/1993 | |
| JP | 2008137636 A | | 6/2008 | |

OTHER PUBLICATIONS

European Search Report in corresponding European Application No. EP 09 16 6902, dated Jan. 8, 2010.

* cited by examiner

*Primary Examiner* — Leshui Zhang

(57) ABSTRACT

A method of active noise reduction is described which comprises receiving an audio signal (132) to be played, receiving a noise signal (105, 107, 116, 118, 126), indicative of ambient noise (111), from at least one microphone (104, 106), and generating a noise cancellation signal (114) depending on both, said audio signal (132) and said noise signal (105, 107, 116, 118, 126).

15 Claims, 10 Drawing Sheets

ACTIVE NOISE REDUCTION METHOD USING PERCEPTUAL MASKING

This application claims the priority under 35 U.S.C. §119 of European patent application no. 09166902.8, filed on Jul. 30, 2009, the contents of which are incorporated by reference herein.

FIELD OF INVENTION

The present invention relates to the field of active noise reduction.

BACKGROUND OF INVENTION

Active noise reduction (ANR) is a method to reduce ambient noise by producing a noise cancellation signal with at least one loudspeaker such that the undesired ambient noise perceived by the user is reduced. Reducing the amount of ambient noise may enhance the ear comfort and may improve the music listening experience and the perceived speech intelligibility, e.g. when used in combination with voice communication.

In active noise reduction, one or more microphones generate a noise reference (a reference of the ambient noise) and a loudspeaker produces a noise cancellation signal in the form of anti-noise which at least partially cancels the ambient noise such that the level of ambient noise perceived by a user is reduced or eliminated. The case of active noise reduction should be distinguished from sound capture noise reduction, where a noisy recorded microphone signal, e.g. for voice communication, is cleaned up. In other words, while active noise reduction improves the sound quality for the near-end user only, sound capture noise reduction improves the sound quality for the far-end user only. A further distinguishing feature is, that in active noise reduction the microphone generates a noise reference signal corresponding to the ambient noise which is to be reduced or eliminated, whereas the microphone in sound capture noise reduction is provided for recording a user signal of interest.

WO 2007/038922 discloses a system for providing a reduction of audible noise perception for a human user which is based on the psychoacoustic masking effect, i.e. on the effect that a sound due to another sound may become partially or completely inaudible. The psychoacoustic masking effect is used to reduce or even eliminate the human perception of an auditory noise by providing a masking sound to the human user, where the intensity of an input signal, such as music or another entertainment signal, is adjusted based on the intensity of the auditory noise by applying existing knowledge about the properties of the human auditory perception and is provided to the human user as a masking sound signal, so that the masking sound elevates the human auditory perception threshold for at least some of the noise signal, whereby the user's perception of that part of the noise signal is reduced or eliminated.

However, increasing the intensity of an input signal may lead to a distortion of the input signal.

In view of the described situation, there exists a need for an improved technique that enables for active noise reduction with improved characteristics, while substantially avoiding or at least reducing some or more of the above-identified problems.

SUMMARY OF INVENTION

This need may be met by the subject-matter according to the independent claims. Advantageous embodiments of the herein disclosed subject-matter are described by the dependent claims.

According to a first aspect of the invention, there is provided a method of active noise reduction, the method comprising receiving an audio signal to be played; receiving at least one noise signal from at least one microphone, wherein the noise signal is indicative of ambient noise; and generating a noise cancellation signal depending on both, the audio signal and the at least one noise signal.

By generating the noise cancellation signal depending on both, the audio signal and the at least one noise signal, situations are avoided or reduced, where ambient noise is reduced in a frequency region where the noise is already at least partially masked by the audio signal. Hence, noise reduction (or noise cancellation) may be focused in frequency regions where the noise is not masked by the audio signal. In this way, noise reduction efficiency may be improved.

Generally herein a noise signal from at least one microphone may be e.g. a raw microphone signal or a filtered version of a raw microphone signal.

According to an embodiment, the noise cancellation signal is configured for reducing the intensity of the ambient noise, and in particular for reducing the intensity of ambient noise in frequency regions where the ambient noise is not masked by the audio signal.

According to an embodiment, generating the noise cancellation signal may include summing or combining the two or more noise signals in order to generate the noise cancellation signal. According to an embodiment, the noise signals may be processed (e.g. filtered) before combining/summing.

According to an embodiment, the method according to the first aspect comprises simultaneously playing the audio signal and the noise cancellation signal. Herein, simultaneously playing includes playing the audio signal and the noise cancellation signal with a well-defined time offset.

According to a further embodiment of the first aspect, generating the noise cancellation signal comprises providing an active noise reduction filter having filter parameters which define filter characteristics of the active noise reduction filter and providing optimized values for the filter parameters of the active noise reduction filter, which depend on the audio signal and at least one of the at least one noise signal. Further, generating the noise cancellation signal may comprise filtering the at least one noise signal with the corresponding active noise reduction filter by using the optimized values for the filter parameters. According to other embodiments, generating the noise cancellation signal may be performed in different ways.

It should be understood that for different noise signals different active noise reduction filters may be provided. Generally, a filter assembly may be provided for filtering the at least one noise signal, wherein the filter assembly comprises at least one active noise reduction filter. The filter assembly may e.g. implement a feedforward configuration wherein the filter assembly comprises one or more feedforward filters. According to other embodiments, the filter assembly may e.g. implement a feedback configuration wherein the filter assembly comprises one or more feedback filters. According to still further embodiments, the filter assembly may e.g. implement a feedforward-feedback configuration wherein the filter assembly comprises one or more feedforward filters and one or more feedback filters.

According to a further embodiment of the first aspect, the method further comprises determining the optimized values for the filter parameters in an optimization procedure, wherein the optimization procedure uses the spectro-temporal characteristics of the audio signal and the spectro-temporal characteristics of the at least one noise signal in order to improve perceptual masking of the residual noise by the audio signal. By improving the perceptual masking of the ambient noise by the audio signal a very efficient active noise reduction is provided.

According to a further embodiment of the first aspect, the method comprises determining a (frequency dependent) frequency masking threshold from the audio signal. For example, according to one embodiment, the frequency masking threshold is determined by using a psychoacoustic masking model.

Further, according to an embodiment, the method comprises determining a desired active performance indicating how much the ambient noise must be suppressed such that it is masked by the audio signal, and optimizing said filter parameters so as to decrease the difference between the actual active performance and said desired active performance, thereby providing the optimized values of the filter parameters. According to an embodiment, the desired active performance is determined from the difference between the frequency masking threshold and a power spectral density of said at least one noise signal. Herein, the term power spectral density of said at least one noise signal comprises e.g. the power spectral density of a single noise signal, the power spectral density of a combination/sum of two or more noise signals, etc.

Further, according to another embodiment, the method comprises optimizing the filter parameters so as to decrease the difference between the power spectral density of the residual noise signal and the frequency masking threshold, thereby providing the optimized values of the filter parameters.

It should be understood, that using a psychoacoustic masking model involves taking into account fundamental properties of the human auditory system, wherein the model indicates which acoustic signals or combinations of acoustic signals are audible and inaudible to a person with normal hearing. According to other embodiments, the psychoacoustic masking model is adapted for hearing-impaired users. Psychoacoustic masking models are well-known in the art.

The noise signal which is indicative of the ambient noise may be generated by any suitable means. For example, according to an embodiment, at least one of the at least one noise signal is a feedforward signal obtained by receiving a reference microphone signal from a reference microphone which is configured for receiving ambient noise and generating in response hereto the reference microphone signal. For example, the reference microphone may be provided on the outside of, i.e. external to, a headset.

According to a further embodiment, at least one of the at least one noise signal is a feedback signal which is obtained by receiving an error microphone signal from an error microphone which is configured for receiving said ambient noise, said noise cancellation signal and said audio signal, and for generating in response hereto said error microphone signal. It should be noted that the noise cancellation signal and the audio signal as received by the error microphone are filtered by a secondary path between the loudspeaker and the error microphone. According to an embodiment, the error microphone may be placed such that the sound which is received by the error microphone is identical or close to the sound which is received by a user's ear. Hence, the error microphone receives the ambient noise as well as the sound corresponding to the audio signal. For example, according to an embodiment, the error microphone may be placed internal to a headset.

According to a further embodiment, at least one of said at least one noise signal is an ambient noise estimation signal, obtained by subtracting an estimate of a secondary path signal from the error microphone signal, wherein the secondary path signal is a signal received by an error microphone which corresponds to the sum of said audio signal and said noise cancellation signal, and wherein said error microphone signal is generated by an error microphone which is configured for receiving said ambient noise, said noise cancellation signal and said audio signal, and for generating in response hereto said error microphone signal.

Since the error microphone receives the ambient noise, the noise cancellation signal and the audio signal, the component which corresponds to the audio signal must be subtracted in order to generate the noise signal which is indicative of the residual ambient noise only.

It should be noted that an ambient noise estimation signal may be generated in addition or alternatively to the generation of a feedback signal. Further, for generating the ambient noise estimation signal and the feedback signal different error microphones or the same error microphone may be used.

While according to some embodiments, a noise signal is either a feedforward signal or a feedback signal, according to other embodiments of the first aspect, the "at least one noise signal" is a combination of a feedforward signal and a feedback signal.

According to a second aspect of the herein disclosed subject-matter, a cancellation signal generator is provided, the cancellation signal generator comprising a first input for receiving an audio signal to be played, a second input for receiving from at least one microphone at least one noise signal indicative of ambient noise. Further, the cancellation signal generator is configured for generating a noise cancellation signal depending on both, the audio signal and the noise signal.

According to an embodiment, the noise cancellation signal is provided for reducing the ambient noise to a residual noise when played by the loudspeaker of an active noise reduction system comprising the cancellation signal generator. Herein, receiving a noise signal from at least one microphone includes directly receiving the noise signal from a microphone without filtering of the microphone output. Further, receiving the noise signal from at least one microphone may include, according to embodiments, filtering of the output of the at least one microphone. For example, according to an embodiment of the second aspect, the at least one noise signal may be a feedforward signal, a feedback signal, or a combination of a feedforward signal and a feedback signal.

According to a further embodiment of the second aspect, the cancellation signal generator comprises a power spectrum unit for providing, on the basis of the noise signal, an ambient noise power spectrum density corresponding to the ambient noise. Further, according to an embodiment of the second aspect, the cancellation signal generator comprises a psychoacoustic masking model unit for generating, on the basis of the audio signal, a frequency dependent masking threshold, which masking threshold indicates the power below which a noise signal is masked by the audio signal. According to a further embodiment of the second aspect, the cancellation signal generator comprises a subtraction unit for calculating, e.g. as a desired active performance, a difference of the ambient noise power spectrum density and the masking threshold.

According to a further embodiment, the cancellation signal generator according to the second aspect further comprises an active noise reduction filter having filter characteristics depending on both, the audio signal and the ambient noise signal. According to a further embodiment of the second aspect, the active noise reduction filter is configured for filtering the at least one noise signal to thereby generate the noise cancellation signal.

According to a further embodiment of the second aspect, the active noise reduction filter has filter parameters which define the filter characteristics of the active noise reduction filter. According to a further embodiment of the second aspect, the cancellation signal generator comprises a filter optimization unit which is configured for providing optimized values for the filter parameters of the active noise reduction filter depending on both, the audio signal and the noise signal.

According to a further embodiment of the second aspect, the filter optimization unit is configured for optimizing the values of the filter parameters such that the actual active performance reaches a predetermined desired active performance provided by the subtraction unit to a predefined extent. Herein, reaching a predetermined desired active performance to a predefined extent includes reaching the predetermined desired active performance within certain limits, e.g. approaching the desired active performance to a certain degree. Further, reaching a predetermined desired active performance to a predefined extent includes having performed a maximum number of iterations, wherein the maximum number may be a fixed number according to one embodiment, or may be an adapted parameter according to other embodiments.

According to a third aspect of the herein disclosed subject-matter, an active noise reduction audio system is provided, the active noise reduction audio system comprising a cancellation signal generator according to the second aspect or an embodiment thereof, the loudspeaker for playing the audio signal, and at least one microphone for providing the at least one noise signal. According to a further embodiment, the loudspeaker for playing the audio signal is also used for playing the noise cancellation signal. According to other embodiments, separate loudspeakers are provided for playing the audio signal and for playing the noise cancellation signal. According to still other embodiments, two or more loudspeakers are provided for playing each the audio signal and/or the noise cancellation signal.

According to a fourth aspect of the herein disclosed subject-matter, a computer program for processing of physical objects is provided, wherein the computer program, when being executed by a data processor, is adapted for controlling the method according to the first aspect or an embodiment thereof.

According to a fifth aspect of the herein disclosed subject-matter, a computer program for processing physical objects is provided, wherein the computer program, when executed by a data processor, is adapted for providing the functionality of the cancellation signal generator according to the second aspect or an embodiment thereof. According to further embodiments, the computer program is configured for providing the functionality of one or more of the units of the cancellation signal generator according to the second aspect or an embodiment thereof.

As used herein, a reference to a computer program is intended to be equivalent to a reference to a program element and/or a computer readable medium containing instructions for controlling a computer system to coordinate the performance of the above described method/functionality of components/units.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

In the following there will be described exemplary embodiments of the subject matter disclosed herein with reference to a method of active noise reduction and a cancellation signal generator. It has to be pointed out that of course any combination of features relating to different aspects of the herein disclosed subject matter is also possible. In particular, some embodiments have been described with reference to apparatus type claims whereas other embodiments have been described with reference to method type claims. However, a person skilled in the art will gather from the above and the following description that, unless other notified, in addition to any combination of features belonging to one aspect also any combination between features relating to different aspects or embodiments, for example even between features of the apparatus type claims and features of the method type claims is considered to be disclosed with this application.

Further, it is noted that aspects and embodiments of the herein disclosed subject matter may be combined with other methods of active noise reduction as well as even with other techniques such as sound capture noise reduction.

The aspects and embodiments defined above and further aspects and embodiments of the present invention are apparent from the examples to be described hereinafter and are explained with reference to the drawings, but to which the invention is not limited.

DETAILED DESCRIPTION

Figure 1:
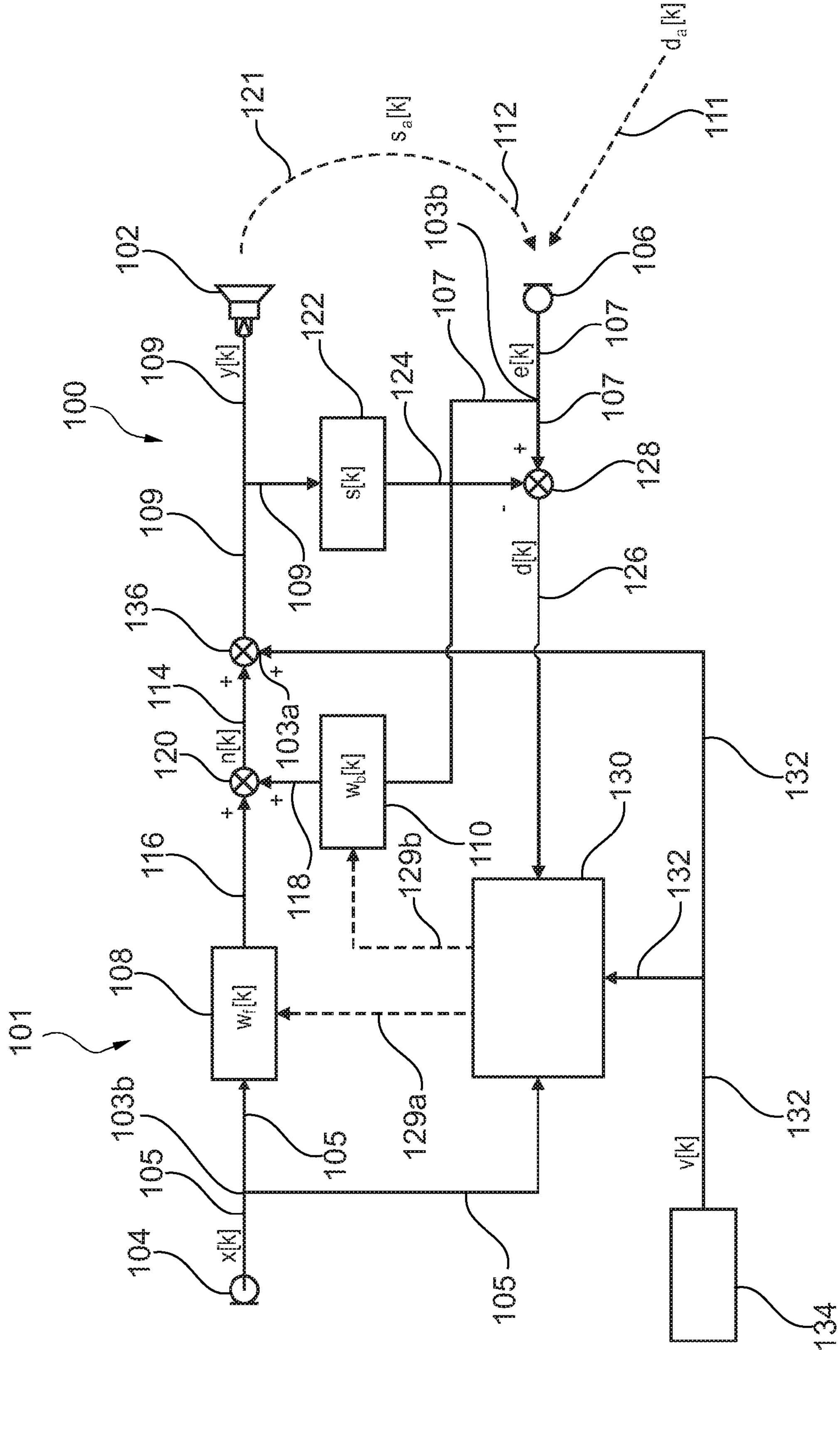
FIG. 1 shows an active noise reduction system according to embodiments of the herein disclosed subject matter.

The illustration in the drawings is schematic. It is noted that in different figures, similar or identical elements are provided with the same reference signs or with reference signs, which are different from the corresponding reference signs only within the first digit.

FIG. 1 shows a block diagram of a combined feedforward-feedback ANR system 100 according to embodiments of the herein disclosed subject matter. The ANR system 100 consists of a loudspeaker 102, an external reference microphone 104, and an internal error microphone 106, although it should be noted that the proposed method can be easily generalized for multiple loudspeakers, and multiple reference and error microphones. The reference microphone signal 105 is denoted by x[k], the error microphone signal 107 is denoted by e[k], and the loudspeaker signal 109 is denoted by y[k]. The error microphone 106 records both the ambient noise $d_a[k]$, indicated at 111, and the secondary path signal 112, which is given by $s_a[k]$åy[k] where $s_a[k]$ represents the secondary path 121, i.e. the acoustic transfer function from the loudspeaker to the error microphone, and å represents convolution. Hence the error microphone signal 107 is $$e[k]=d_a[k]+s_a[k]\text{å}y[k], \qquad (1)$$

wherein the subscript a denotes a perfect digital representation of an analogue signal or filtering operation. In practice, the secondary path 121 is estimated by a secondary path filter 122, denoted by s[k] in FIG. 1. The loudspeaker signal 109 is then filtered by the secondary path filter 122, resulting in a filtered loudspeaker signal 124, which is an estimate of the secondary path signal 112. The difference of the error microphone signal 107 and the filtered loudspeaker signal 124 yields the ambient noise estimation signal 126, which is an estimate for the ambient noise 111 at the error microphone 106. The ambient noise estimation signal 126 is denoted by d[k] in FIG. 1 and is computed by a summing unit 128.

In order to reduce the ambient noise 111 at the error microphone 106 (which corresponds to the noise perceived by the user), a noise cancellation signal 114 is generated with the loudspeaker. According to an embodiment, the noise cancellation signal 114, denoted by n[k], is the sum of a filtered reference microphone signal 116 and a filtered error microphone signal 118, i.e.

$$n[k]=w_f[k]\text{å}x[k]+w_b[k]\text{å}e[k], \qquad (2)$$

where $w_f[k]$ denotes the feedforward filter 108 and $w_b[k]$ denotes the feedback filter 110. Summing of the microphone signals 116, 118 is performed by a summing unit 120. Although the ANR filters 108, 110 are denoted in the digital domain, the ANR filtering operations can also be performed using analogue filters or hybrid analogue-digital filters in order to relax the latency requirements of the A/D and D/A convertors (not shown in FIG. 1).

The filter parameters, indicated at 129*a* and 129*b*, of the feedforward filter 108 and the feedback filter 110 are determined by a psychoacoustic filter computation unit 130. The filter computation unit receives, in an embodiment, the ambient noise estimation signal 126, the reference microphone signal 105, and an audio signal 132, given by v[k] in FIG. 1, from an audio source 134. Hence, in accordance with embodiments of the herein disclosed subject matter, the psychoacoustic filter computation unit 130 receives two noise signals, the feedforward signal 105 and the feedback signal 126. Further in accordance with embodiments of the herein disclosed subject matter, the psychoacoustic filter computation unit 130 receives the audio signal 132. From these input signals 105, 126 and 132, the psychoacoustic filter computation unit 130 determines optimized values for the filter parameters of the feedforward filter 108 and the feedback filter 110. Summing the outputs of these filters, which correspond to filtered noise-related signals 116 and 118 determine the noise cancellation signal 114 which is added to the audio signal 132 at a summing unit 136, thereby yielding the loudspeaker signal 109. Details of embodiments of the psychoacoustic filter computation unit 130 are given below.

It should be noted that the ANR system of FIG. 1 may be considered as comprising the audio source 134, the loudspeaker 102 and a cancellation signal generator 101 which comprises, according to an embodiment, the remaining elements shown in FIG. 1. Hence, in accordance with an embodiment, the cancellation signal generator 101 has a first input 103*a* for receiving the audio signal 132 to be played and a second input 103*b* for receiving from the at least one microphone 104, 106 at least one noise signal 105, 107 indicative of the ambient noise 111.

Figure 2:
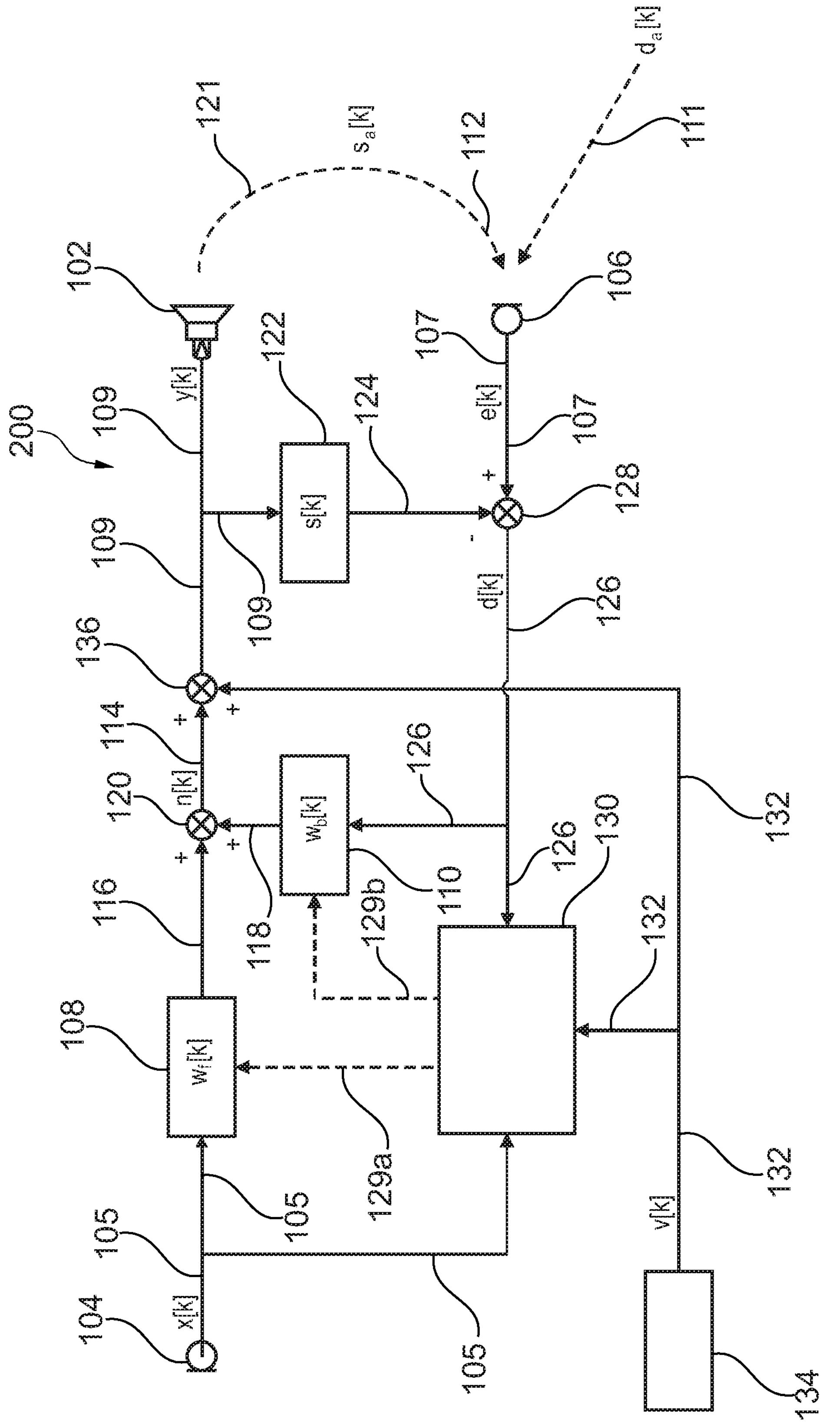
FIG. 2 shows a further active noise reduction system according to embodiments of the herein disclosed subject matter.

A modification for the feedback loop of the ANR system in FIG. 1 is depicted in FIG. 2. Accordingly, FIG. 2 shows a ANR system 200 where an estimate 124 of the loudspeaker contribution at the error microphone 106 is first subtracted from the error microphone signal 107 before filtering with the feedback filter 110. It should be noted that in FIG. 2 similar or identical elements are denoted with the same reference signs as in FIG. 1 and the description thereof is not repeated here. Hence, in the case of FIG. 2 the noise cancellation signal n[k] and the ambient noise estimation signal 126, denoted by d[k], are given by $$n[k]=w_f[k]\text{å}x[k]+w_b[k]\text{å}d[k], \qquad (3)$$

$$d[k]=e[k]-s[k]\text{å}y[k], \qquad (4)$$

where again s[k] represents an estimate of the secondary path $s_a[k]$. Here, it is assumed that an estimate of the secondary path is available. Different methods can be found in the literature for identifying this secondary path, either by using a fixed estimate, e.g. obtained before the ANR system is enabled, or by updating the estimate during ANR operation using an adaptive filtering algorithm operating on the audio signal (and possibly an artificial additional noise source) and the error microphone signal.

In the following, an ANR system as shown in FIG. 2 will be described in more detail, although the proposed method for optimising the ANR filters using perceptual masking can in principle also be used for the ANR system in FIG. 1. The ANR performance is typically expressed as the active performance (on the error microphone), which is defined as the PSD difference without and with the ANR system enabled, i.e.

$$G(\omega)=10\log_{10}\phi_d(\omega)-10\log_{10}\phi_e(\omega), \quad (5)$$

with $\phi_d(\omega)=E\{|D(\omega)|^2\}$ the PSD of the ambient noise at the error microphone and $\phi_e(\omega)=E\{|E(\omega)|^2\}$ the PSD of the error microphone signal (assuming no audio playback). As used herein, E{x} denotes the expectation value of the stochastic variable x.

When the ANR system, e.g. the system 200 shown in FIG. 2, is used for listening to music or for voice communication, an audio signal v[k] is played simultaneously with the noise cancellation signal, i.e.

$$y[k]=n[k]+v[k]. \quad (6)$$

According to an embodiment, e.g. also in the case shown in FIG. 2, the signal d[k] represents an estimate of the ambient noise at the error microphone and is not influenced by the audio signal v[k]

In the following, in order to facilitate understanding of filter optimisation according to the herein disclosed subject matter, examples of filter optimisation are described wherein the audio signal is not taken into account. Thereafter, modifications resulting from taking into account the audio signal for filter optimisation are described.

The feedforward and feedback filters 108, 110 are typically designed such that the residual noise at the error microphone is minimised, without taking into account the audio signal. If it is assumed that the feedforward and feedback filters $w_f[k]$ and $w_b[k]$ are L-dimensional finite impulse response (FIR) filters $w_f$ and $w_b$, this corresponds to minimising the least-squares (LS) cost function $$\begin{aligned} J(w_f, w_b) &= \int_\Omega E\{|D_a(\omega)+S_a(\omega)N(\omega)|^2\}d\omega \\ &= \int_\Omega E\{|D(\omega)+S(\omega)[X(\omega)w_f^T g(\omega)+D(\omega)w_b^T g(\omega)]|^2\}d\omega, \end{aligned} \quad (7)$$

where Ω denotes the frequency range of interest and $$g(\omega)=[1e^{-j\omega}\ \ldots\ e^{-j(L-1)\omega}]^T. \quad (8)$$

It can be shown that the cost function in (7) can be rewritten as the quadratic function $$J(w)=c+2w^Ta+w^TQw, \quad (9)$$

with $$w=\begin{bmatrix} w_f \\ w_b \end{bmatrix}, \quad (10)$$

and $$a=\int_\Omega \mathrm{Re}\left\{S(\omega)\begin{bmatrix}\varphi_{xd}(\omega)g(\omega) \\ \varphi_d(\omega)g(\omega)\end{bmatrix}\right\}d\omega, \quad (11)$$

$$Q=\int_\Omega |S(\omega)|^2\mathrm{Re}\left\{\begin{bmatrix}\varphi_x(\omega)g(\omega)g^H(\omega) & \varphi_{xd}(\omega)g(\omega)g^H(\omega) \\ \varphi_{xd}^*(\omega)g(\omega)g^H(\omega) & \varphi_d(\omega)g(\omega)g^H(\omega)\end{bmatrix}\right\}d\omega, \quad (12)$$

with $$\varphi_x(\omega)=E\{|X(\omega)|^2\},\ \varphi_{xd}(\omega)=E(X(\omega)D^*(\omega)\}. \quad (13)$$

Since X(ω), D(ω) and S(ω) can be obtained by a frequency analysis (e.g. using the discrete-time Fourier transform) of the reference microphone signal x[k], the ambient noise estimation signal d[k], and the estimate of the secondary path s[k], the feedforward and feedback filters $w_f$ and $w_b$ can be obtained by minimising the quadratic cost function in (7), i.e.

$$w=Q^{-1}a. \quad (14)$$

However, the inventors found that, since the above described optimisation is independent of the audio signal, the active performance obtained using this method is typically not well matched to the masking properties of the audio signal.

Figure 3:
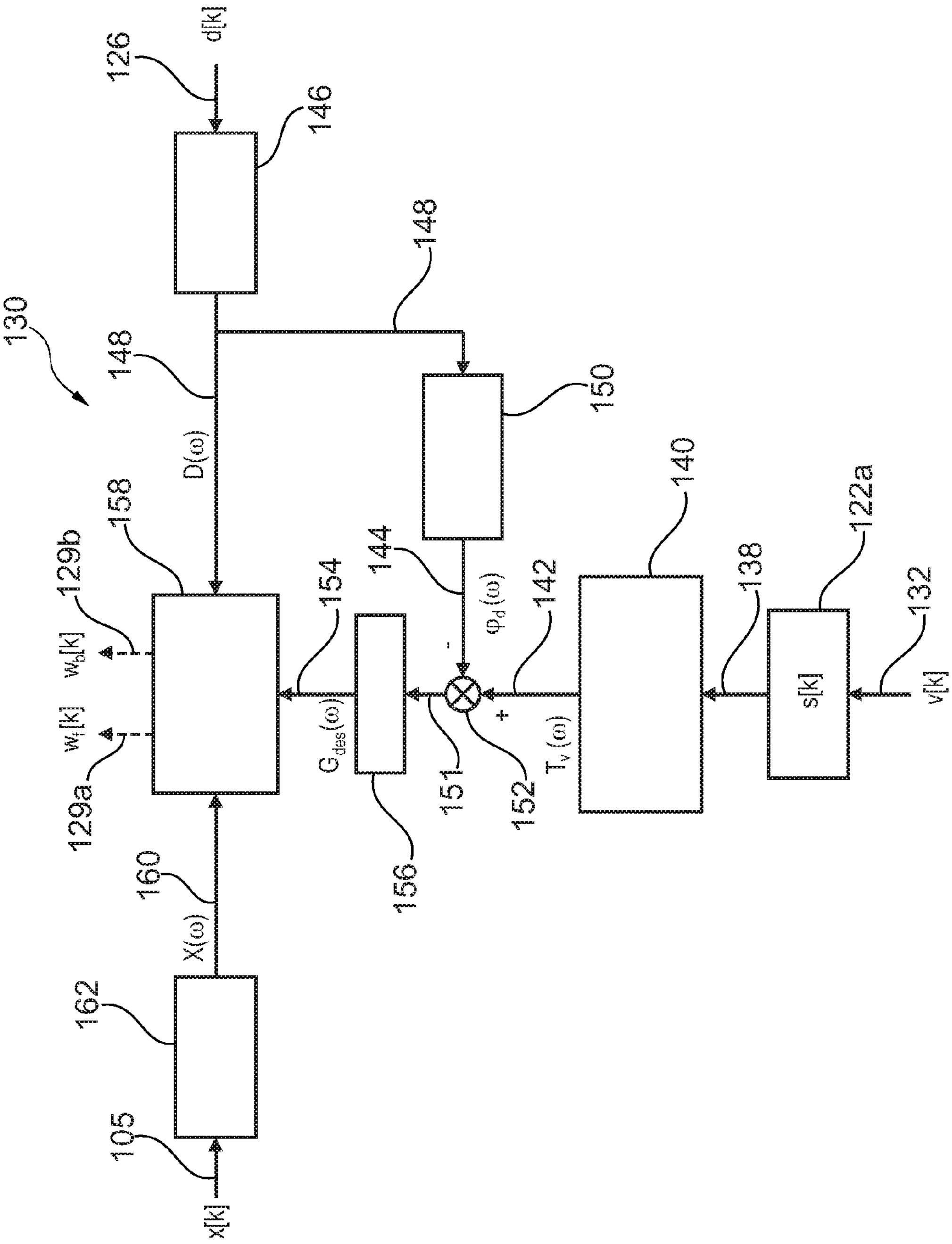
FIG. 3 shows a psychoacoustic filter computation unit of the active noise reduction system of FIG. 2.

Hence, in the following, filter optimisation using perceptual masking will be described. To this end, an optimisation method for the ANR filters will be described that is based on the difference in spectro-temporal characteristics between the audio signal and the ambient noise (at the error microphone), in order to minimise the perception of the residual noise by the user. According to an embodiment, such a filter optimisation is performed by a psychoacoustic filter computation unit, an embodiment of which is depicted in FIG. 3 in block diagram form.

First, the audio contribution at the error microphone is estimated as s[k]åv[k] by filtering the audio signal 132 with a secondary path filter 122*a*, resulting in an estimated audio signal 138 at the error microphone. In one embodiment, the secondary path filter 122*a* is the same secondary path filter as the filter 122 depicted in FIG. 1. According to other embodiments the secondary path filter 122*a* is a separate secondary path filter, which may have the same or different filter characteristics as the filter 122 in FIG. 1.

A frequency masking threshold 142, denoted by $T_v(\omega)$, of the estimated audio signal 138 is computed by a psychoacoustic masking model unit 140 using a psychoacoustic masking model. Based on fundamental properties of the human auditory system (e.g. frequency group creation and signal processing in the inner ear, simultaneous and temporal masking effects in the frequency-domain and the time-domain), a model can be produced to indicate which acoustic signals or which different combinations of acoustic signals are audible and inaudible to a person with normal hearing. The used masking model may be based on e.g. the so-called Johnston Model or the ISO-MPEG-1 model (see e.g. MPEG 1, "Information technology—coding of moving pictures and associated audio for digital storage media at up to about 1.5 Mbit/s—part 3: Audio," ISO/IEC 11172-3: 1993; K. Brandenburg and G. Stoll, "ISO-MPEG-1 audio: A generic standard for coding of high-quality digital audio", Journal Audio Engineering Society, pp. 780-792, October 1994; T. Painter and A. Spanias, "Perceptual coding of digital audio", Proc. IEEE, vol. 88, no. 4, pp. 451-513, April 2000).

According to an embodiment described herein, only simultaneous masking effects (in the frequency-domain) are considered. However, according to other embodiments, additionally or alternatively also temporal masking effects (in the time-domain) may be exploited.

Second, the power spectral density (PSD) 144 of the ambient noise at the error microphone is estimated as $\omega_d(\omega)$. To this end, the ambient noise estimation signal 126, denoted by d[k] in FIG. 3, is received by a frequency analysator 146 which outputs in response hereto a respective transformed quantity 148, denoted as D(ω). Possible transformations may be a Fourier transform, a subband transform, a wavelet transform, etc. In the depicted exemplary case, a Fourier transform is used. The transformed quantity (e.g Fourier transform) 148 is then received by a power spectrum unit 150 which is configured for generating the power spectral density 144 ($\omega_d(\omega)$) of the ambient noise estimation signal 126.

The difference 151 between the ambient noise PSD 144 and the masking threshold 142 of the audio signal indicates how much the ambient noise should be suppressed such that it is masked by the audio signal and hence becomes inaudible to the user. This difference is calculated by a subtraction unit 152. The subtraction unit 152 may include a summing unit and a processing unit (not shown in FIG. 3) for providing the inverse of one of the input signals (indicated by the "−" at the subtraction unit) while the other input signal to the subtraction unit 152 is processed without inversion (indicated by the "+" at the subtraction unit 158). Therefore, according to an embodiment, this difference is the desired active performance 154, denoted as $G_{des}(\omega)$ of the ANR system. Note that additional constraints, indicated at 156 in FIG. 3, may be imposed on the desired active performance, such as minimum performance (e.g. in the low frequencies) and maximum amplification (e.g. in the high frequencies). According to a general embodiment, the audio signal 132 is used for calculating a frequency dependent masking threshold below which the ambient noise is inaudible, i.e. if the power level of the ambient noise is below the masking threshold.

Third, the ANR filters or, as shown in FIG. 3, ANR filter parameters 129*a*, 129*b* are computed in the filter optimisation unit 158 such that the actual active performance approaches the desired active performance 154 as well as possible. According to an embodiment, inputs of the filter optimisation unit are a masking threshold dependent quantity and at least one of a feedback dependent quantity (based on an error microphone signal) and a feedforward dependent quantity (based on a reference microphone signal). For example, in an illustrative embodiment, inputs of the filter optimization unit 158 are the desired active performance 154, the Fourier transform 148 of the ambient noise estimation signal 126 and a Fourier transform 160 of a reference microphone signal 105, which is obtained by frequency analysis (e.g. Fourier transformation) of the reference microphone signal 105. Such frequency analysis is performed e.g. by a frequency analysator 162. Generally, the frequency analysator 162 for the reference microphone signal 105 may be configured similar or analoguous to the frequency analysator 146 for the ambient noise estimation signal 126.

For filter optimization, different methods can be used, e.g. one of the following:

By including a frequency-dependent weighting function $F_i(\omega)$ in the LS cost function of (7), i.e.

$$J_i(w_f,w_b)=\int_\Omega F_i(\omega)|D(\omega)+S(\omega)[X(\omega)w_f^T g(\omega)+D(\omega) w_b^T g(\omega)]|^2 d\omega,( \qquad (15)$$

the active performance can be shaped, since a higher weight increases the active performance, whereas a lower weight decreases the active performance. It should be noted that the method presented in U.S. Pat. No. 7,308,106 may be considered as corresponding to a signal-independent weighting function, e.g. A-weighting or C-weighting. The ANR filters $w_f$ and $w_b$ minimising (15) can be computed similarly to (14) by including the weighting function $F_i(\omega)$ in the computation of a and Q in (11) and (12). However, by increasing the active performance in a certain frequency region, the active performance in another frequency region is typically reduced, such that an iterative procedure should be used for iteratively adjusting the weighting function $F_i(\omega)$ such that the active performance approaches the desired active performance as well as possible.

By directly minimising the difference between the actual active performance $G(\omega)$, which depends on the ANR filters $w_f$ and $w_b$, and the desired active performance $G_{des}(\omega)$, i.e.

$$J_d(w_f,w_b)=\int_\Omega |G(\omega)-G_{des}(\omega)|^2 d\omega. \qquad (16)$$

Minimising this non-linear cost function requires iterative optimisation techniques which are known in the art.

By solving the following constrained optimisation problem $$\min \alpha \text{ subject to } G(\omega)\leq \alpha G_{des}(\omega), \qquad (17)$$

which requires semidefinite programming techniques known in the art.

Simulations using realistic diffuse noise recordings on an audio system in the form of a headset were performed to show the advantage of using perceptual masking for computing the ANR filters. In the simulations a feedback configuration is considered, i.e. the feedforward filter $w_f=0$, which corresponds to the block diagrams in FIG. 4, showing an ANR system 300 in feedback configuration, and in FIG. 5, showing the respective psychoacoustic filter computation unit 330 for the feedback ANR system of FIG. 4.

Figure 4:
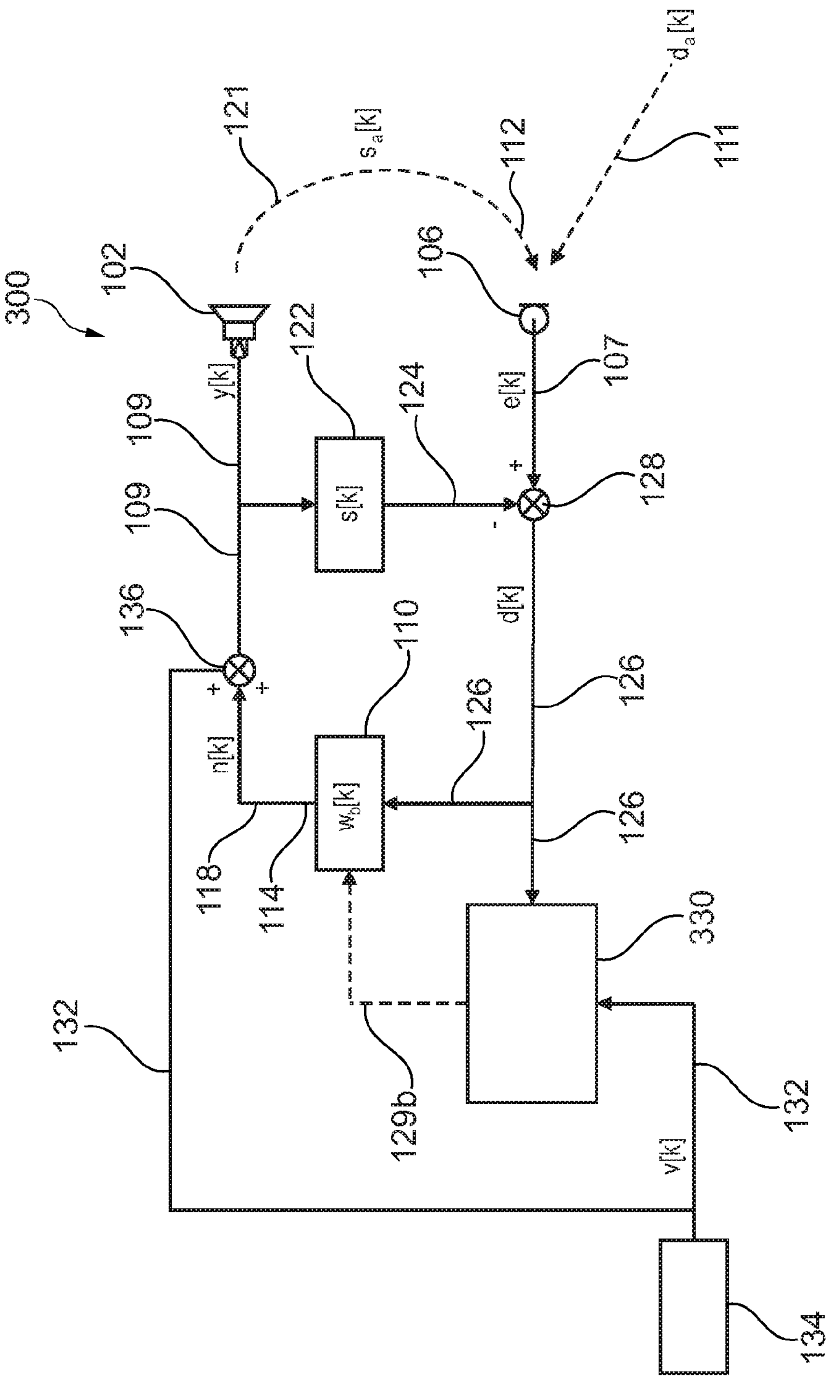
FIG. 4 shows a further active noise reduction system according to embodiments of the herein disclosed subject matter.

In FIG. 4, entities and signals which are identical or similar to those of FIG. 2 are denoted with the same reference signs and the description of these entities and signals is not repeated here. In difference to FIG. 2, the noise cancellation signal 114 in FIG. 4, denoted by n[k], includes only a filtered ambient noise estimation signal 126 with the feedback filter 110, where, as in FIG. 2, the ambient noise estimation signal 126 is calculated as the difference between the filtered loudspeaker signal 124 and the error microphone signal 107.

In accordance with the feedback configuration of the ANR system 300, the psychoacoustic filter computation unit 330 is configured for providing only feedback filter parameters 129*b* to the feedback filter 110. Since an ANR system in feedback configuration does not include a reference microphone and no filtering operation $w_f[k]$, it does not require (and does not include) a summing unit 120 (see FIG. 1 and FIG. 2) for combining the output of feedforward and feedback filtering operations.

Figure 5:
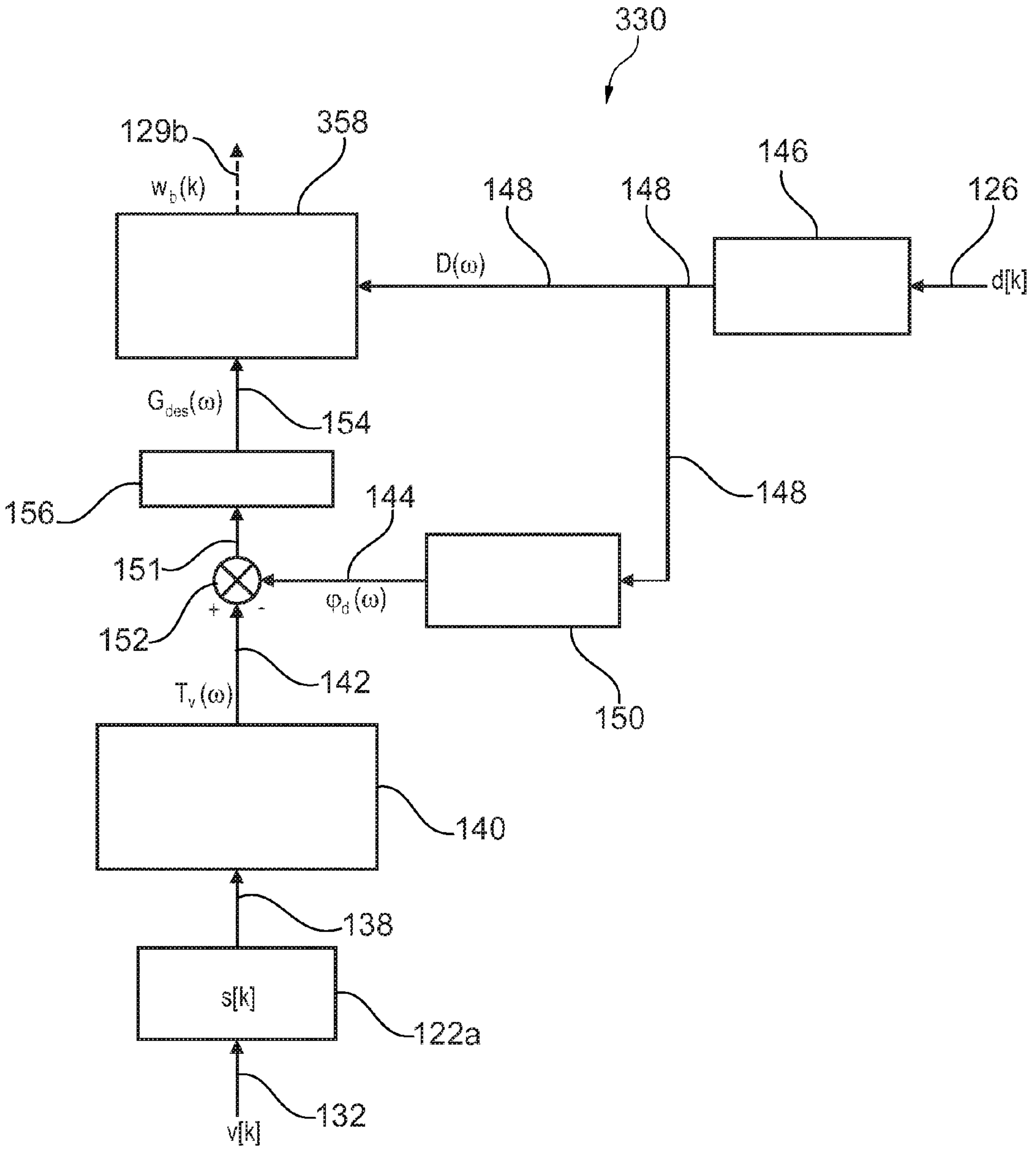
FIG. 5 shows a psychoacoustic filter computation unit of the active noise reduction system of FIG. 4.

FIG. 5 shows the psychoacoustic filter computation unit 330 of FIG. 4 in greater detail. In FIG. 5, entities and signals which are identical or similar to those of FIG. 3 are denoted with the same reference signs and the description of these entities and signals is not repeated here. In difference to the feedback-feedforward filter optimization unit 158 shown in FIG. 3, the filter optimization unit 358 of the feedback ANR receives only the desired active performance 154 and a feedback signal, e.g. in the form of the Fourier transform 148 of the ambient noise estimation signal 126, as shown in FIG. 5.

Figure 6A:
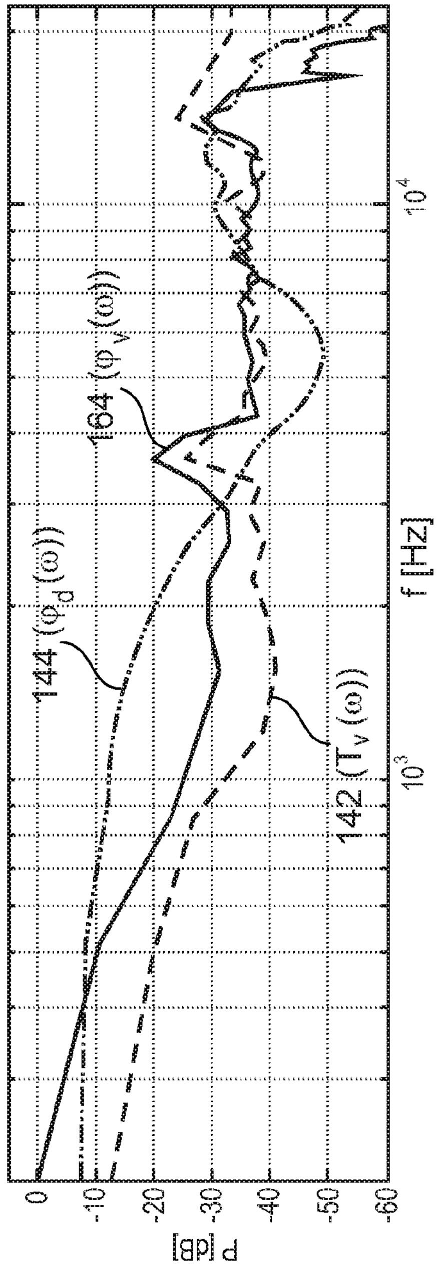
FIG. 6*a* shows the power spectral densities of an exemplary audio signal, ambient noise at the error microphone, and frequency masking threshold.
Figure 6B:
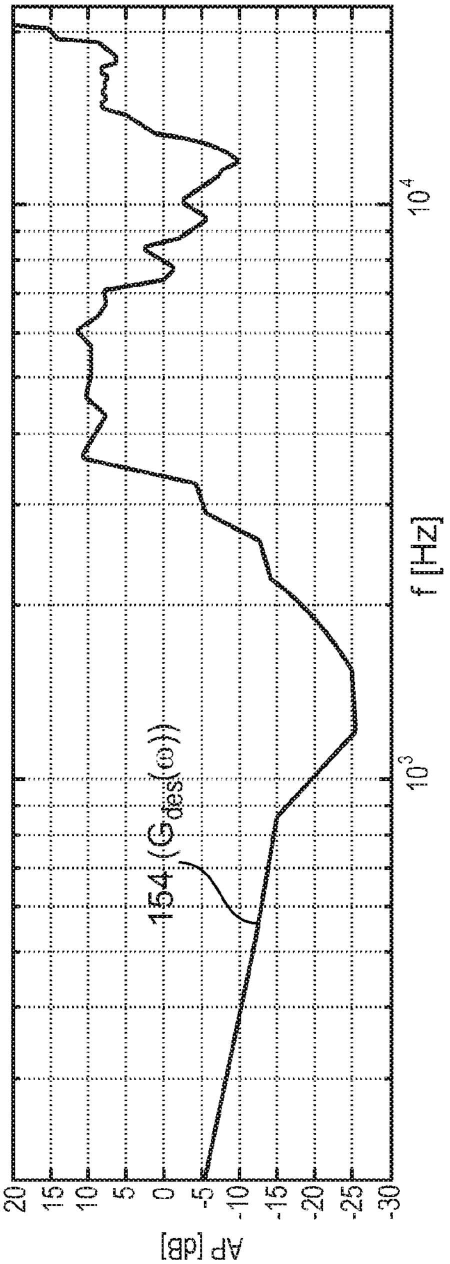
FIG. 6*b* shows the desired active performance corresponding to the signals of FIG. 6*a*.

Having regard to the above mentioned embodiments and examples, FIG. 6*a* shows the power spectral density (PSD) 164 of an exemplary audio signal s[k]åv[k] at the error microphone, from which the frequency masking threshold 142 ($T_v(\omega)$) has been computed using the ISO-MPEG-1 model. FIG. 6*a* also shows exemplary ambient noise PSD 144, denoted as $\phi_d(\omega)$ at the error microphone. In FIG. 6*a* the audio signal PSD 164 and the ambient noise PSD 144, both at the error microphone, as well as the corresponding frequency masking threshold 142 are each shown in units of power P vs. frequency f. From the frequency masking threshold 142 and the ambient noise PSD 144 the desired active performance 154 ($G_{des}(\omega)$) is computed, which is shown in FIG. 6*b* in units of desired active performance (AP) vs. frequency f.

Figure 7A:
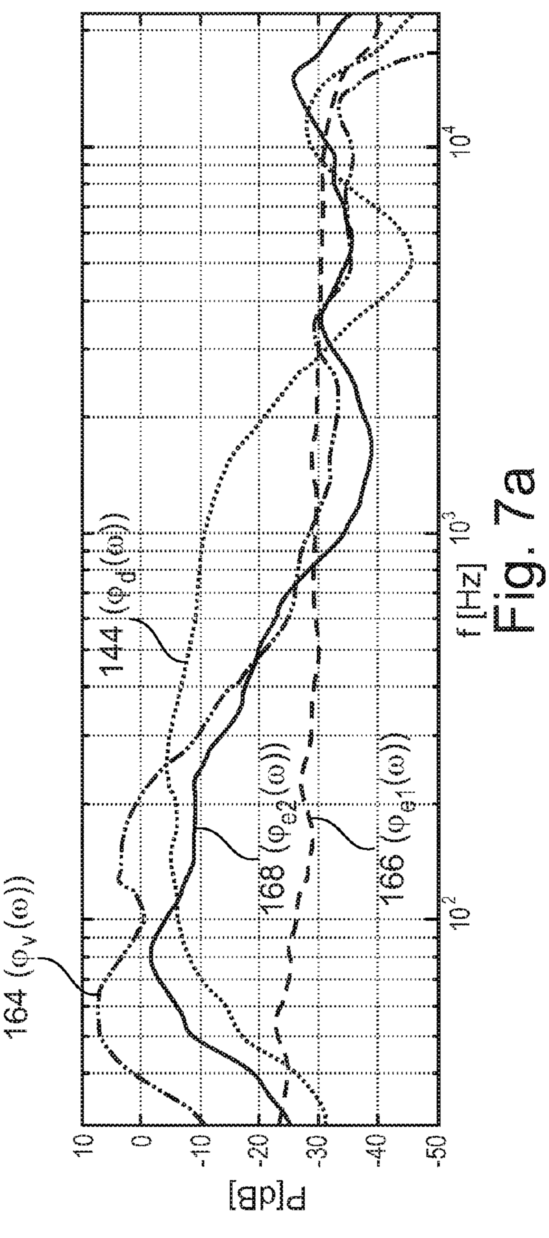
FIG. 7*a* shows the power spectral densities of an exemplary audio signal, ambient noise, residual noise for ANR without perceptual masking, and residual noise for ANR with perceptual masking.

FIG. 7*a* again shows the PSD 164 ($\phi_v(\omega)$) of the audio signal and the ambient noise PSD 144 ($\phi_d(\omega)$), together with two different residual noise PSDs, wherein the power P is drawn vs. frequency f:

a first residual noise PSD 166, denoted as $\phi_{e1}(\omega)$, where the ANR filter is computed with a filter optimisation method which does not take into account the audio signal.

a second residual noise PSD 168, denoted as $(\omega_{e2}(\omega)$, where the ANR filter is computed with the filter optimisation method taking into account (frequency-domain) perceptual masking of the audio signal. The ANR filter has been optimised by iteratively adjusting the weighting function $F_i(\omega)$ in (15).

In FIG. 7*a* all PSDs have been averaged over one octave, which is a standard procedure in ANR applications.

As can be observed from FIG. 7*a*, $\phi_{e2}(\omega)$ contains more residual noise than $\phi_{e1}(\omega)$ for frequencies below 800 Hz and above 8 kHz, but contains less residual noise for frequencies between 800 Hz and 8 kHz. It is however clear that $\phi_{e2}$ $(\omega)$ is better matched to the spectral characteristics of the audio signal than $\phi_{e1}(\omega)$.

Figure 7B:
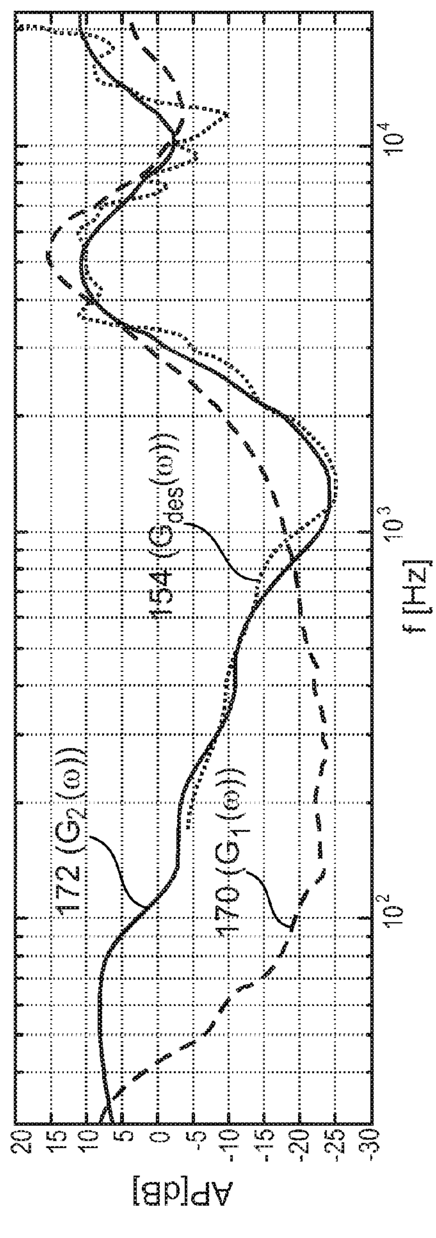
FIG. 7*b* shows the desired active performance for the signals in FIG. 7*a*, the active performance for ANR without perceptual masking and the active performance for ANR with perceptual masking.

FIG. 7*b* shows the active performance $G_1(\omega)$, indicated at 170 in FIG. 7*b*, for the ANR filter without perceptual masking and $G_2(\omega)$, indicated at 172 in FIG. 7*b*, for the ANR filter with perceptual masking, together with the desired active performance $G_{des}(\omega)$, indicated at 154 in FIG. 7*b*. As can be observed, the active performance $G_2(\omega)$ of the ANR filter with perceptual masking is very close to the desired active performance $G_{des}(\omega)$.

Figure 8:
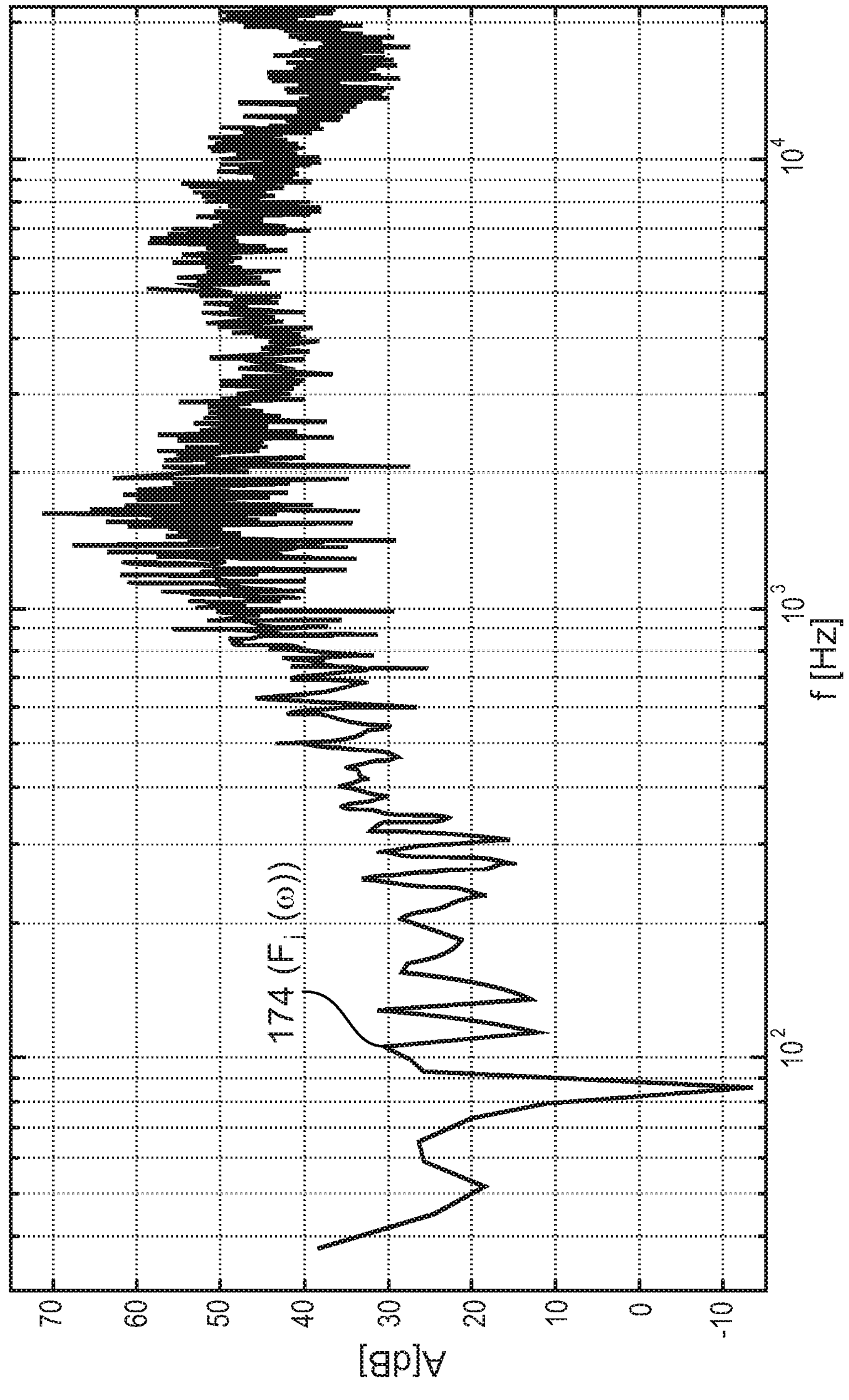
FIG. 8 shows a weighting function for the signals of FIG. 7*a* after convergence of the optimisation.

As mentioned above, the ANR filter for the second residual noise PSD 168, where the ANR filter takes into account perceptual masking according to embodiments of the herein disclosed subject matter, has been optimised by iteratively adjusting the weighting function $F_i(\omega)$ in (15). The weighting function $F_i(\omega)$ after convergence, indicated at 174, is depicted in FIG. 8, where the amplitude A is drawn vs. frequency f.

Figure 9:
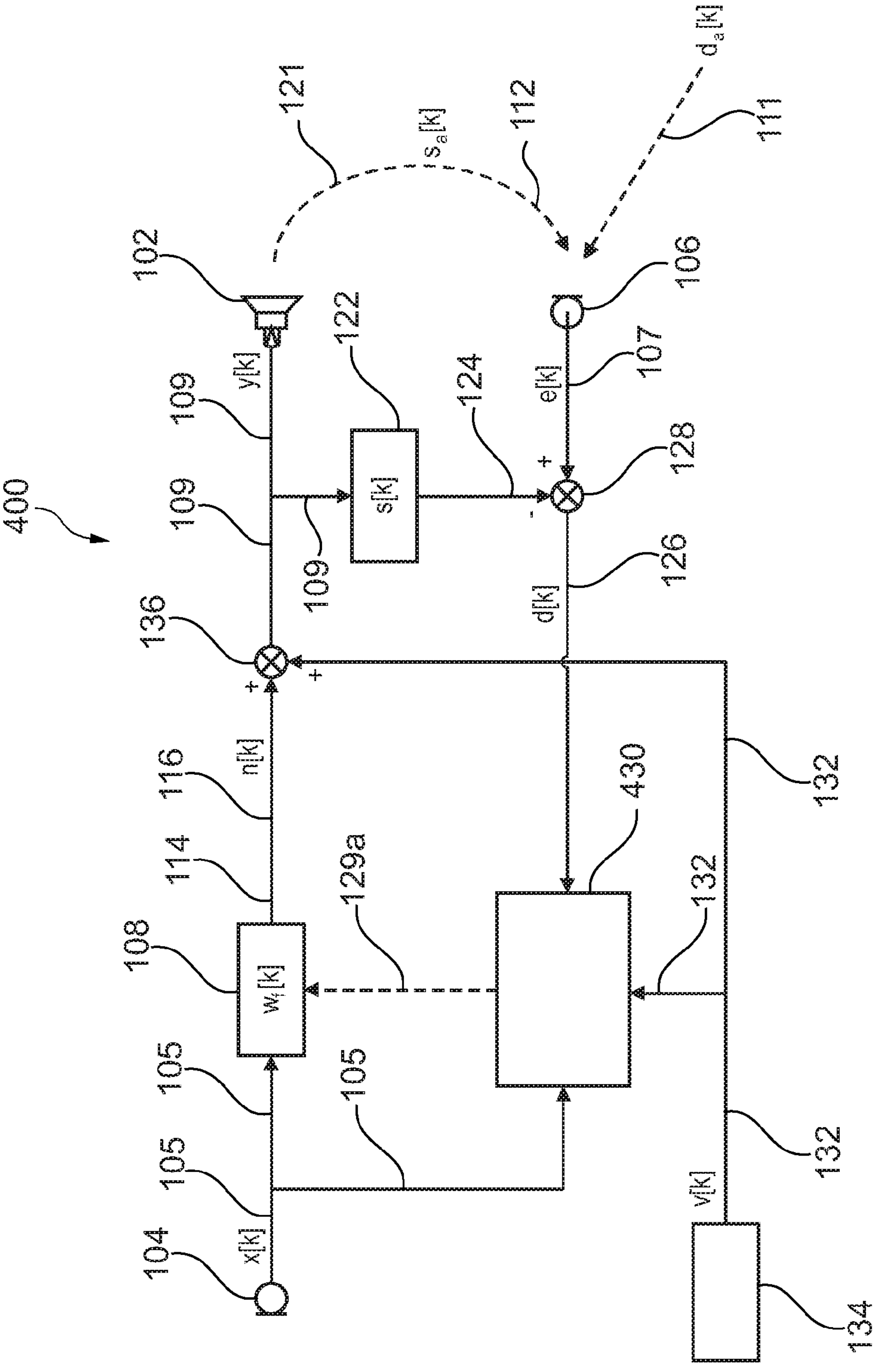
FIG. 9 shows a further active noise reduction system according to embodiments of the herein disclosed subject matter.
Figure 10:
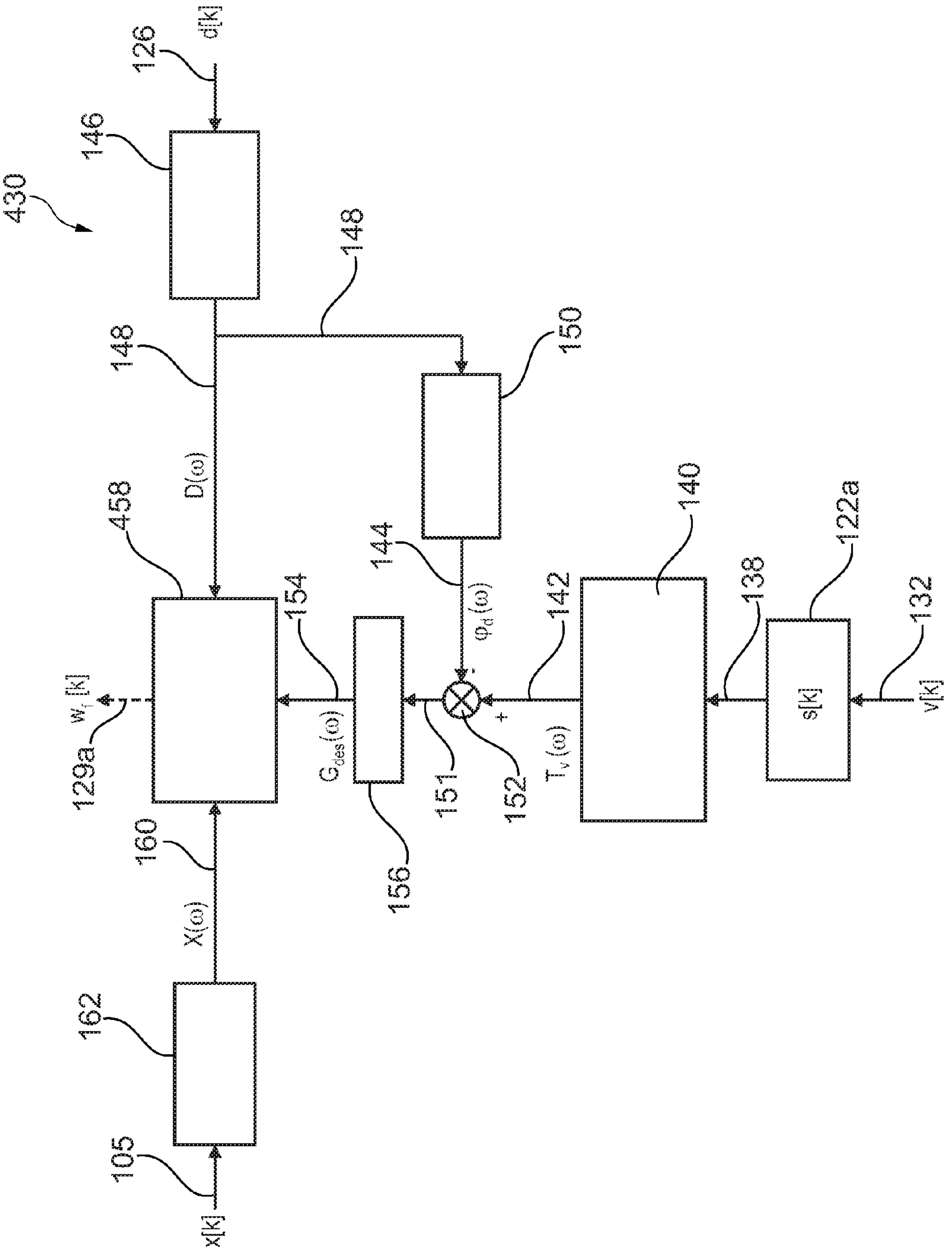
FIG. 10 shows a psychoacoustic filter computation unit of the active noise reduction system of FIG. 9.

FIGS. 9 and 10 illustrate an ANR system 400 and a respective psychoacoustic filter computation unit 430 according to embodiments of the herein disclosed subject matter. In contrast to FIG. 4 and FIG. 5, which relate to a feedback configuration, the ANR system 400 and the psychoacoustic filter computation unit 430 of FIG. 9 and FIG. 10, respectively, relate to a feedforward configuration.

In FIG. 9, entities and signals of the ANR system 400 which are identical or similar to those of FIG. 2 are denoted with the same reference signs and the description of these entities and signals is not repeated here. In difference to FIG. 2, the noise cancellation signal 114 in FIG. 4, denoted by n[k], includes only a filtered reference microphone signal 116, which is obtained by filtering the reference microphone signal 105 with a feedforward filter 108.

In accordance with the feedback configuration of the ANR system 400, the psychoacoustic filter computation unit 430 is configured for providing only feedforward filter parameters 129*a* to the feedforward filter 108. Since the ANR system in feedforward configuration does not include a filtering operation $W_b[k]$, it does not require (and does not include) a summing unit 120 (see FIGS. 1 and 2) for combining the output of feedforward and feedback filtering operations.

FIG. 10 shows the psychoacoustic filter computation unit 430 of FIG. 9 in greater detail. In FIG. 10, entities and signals which are identical or similar to those of FIG. 3 are denoted with the same reference signs and the description of these entities and signals is not repeated here. In difference to the feedback filter optimization unit 358 shown in FIG. 5 and in accordance with the feedback-feedforward filter optimization unit 158 shown in FIG. 3, the filter optimization unit 458 of the feedforward ANR system 400 receives three input signals, the desired active performance 154, a feedforward signal e.g. in the form of the Fourier transform 160 of the reference microphone signal, and a feedback signal e.g. in the form of the Fourier transform 148 of the ambient noise estimation signal 126, as shown in FIG. 10. However, in contrast to the feedback-feedforward filter optimization unit 158, the feedforward filter optimization unit 458 optimizes only the feedforward filter 108, e.g. by outputting only filter parameters 129*a* for the feedforward filter 108.

According to embodiments of the herein disclosed subject matter, any component of the active noise reduction (ANR) system, e.g. the above mentioned units and filters are provided in the form of respective computer program products which enable a processor to provide the functionality of the respective entities as disclosed herein. According to other embodiments, any component of the ANR system, e.g. the above mentioned units and filters may be provided in hardware. According to other—mixed—embodiments, some components may be provided in software while other components are provided in hardware.

It should be noted that the term “comprising” does not exclude other elements or steps and the “a” or “an” does not exclude a plurality. Also elements described in association with different embodiments may be combined. It should also be noted that reference signs in the claims should not be construed as limiting the scope of the claims.

In order to recapitulate the above described embodiments of the present invention one can state:

ANR can be beneficial for several applications, such as headsets, mobile phone handsets, cars and hearing instruments. In particular, ANR headsets are becoming increasingly popular, as they are able to effectively reduce the noise experienced by the user, and thus, increase the comfort in noisy environments such as trains and airplanes.

Embodiments of an ANR system like e.g. an ANR headset consist of a loudspeaker, one or several microphones, and a filtering operation on the microphone signal(s). In a feedforward configuration, at least one reference microphone is mounted outside the headset and the loudspeaker signal is a filtered version of the reference microphone signal(s). When at least one error microphone is mounted inside the headset, the filtering operation can be optimised since the error microphone signal(s) provide feedback about the residual noise at the error microphone(s), which typically corresponds well to the noise that is actually perceived by the user. The filter can e.g. be designed such that the sound level at the error microphone is minimised. In a feedback configuration, only at least one error microphone is present, and the loudspeaker signal is a filtered version of the error microphone signal(s). Also for this configuration, the filtering operation can be optimised, e.g. minimizing the sound level at the error microphone(s). In addition, in a combined feedforward-feedback configuration the loudspeaker signal is the sum of the filtered version of the reference and error microphone signals.

When the ANR headset is used for listening to music or for voice communication, in an embodiment an audio signal is played through the loudspeaker simultaneously with the noise cancellation signal. In known ANR schemes with simultaneous audio playback, the optimisation/adaptation of the ANR filtering operations is aimed to be completely independent of the audio signal. According to the herein disclosed subject matter, a method is presented where the ANR filtering operations are optimised based on the difference in spectro-temporal characteristics between the audio signal and the ambient noise, in order to minimise the perception of the residual noise by the user without distorting the audio signal. More in particular, according to an embodiment, a perceptual masking effect, i.e. the fact that a sound may become partially or completely inaudible due to another sound, is used. The presented methods can be used e.g. for feedforward, feedback and combined feedforward-feedback configurations.

Embodiments of an ANR system using a combined feedforward-feedback configuration (i.e. as shown in FIGS. 1 and 2), may comprise one or more of the following features:

- at least one reference microphone, recording the reference microphone signal x[k]
- at least one error microphone, recording the error microphone signal e[k]
- at least one loudspeaker, playing back the loudspeaker signal y[k]
- an audio signal v[k]
- a digital filter s[k] operating on the loudspeaker signal. This filter represents an estimate of the secondary path $s_a$[k] and can either be fixed or updated during ANR operation (the update scheme is not shown in the figures). By subtracting the output of this filter from the error microphone signal, the signal d[k] is obtained, which represents an estimate of the ambient noise at the error microphone.
- a filtering operation $w_f$[k] operating on the reference microphone signal. This filtering operation can be implemented using a programmable digital filter, analogue filter or hybrid analogue-digital filter.
- a filtering operation $w_b$[k] operating either on the error microphone signal (cf. FIG. 1) or on the signal d[k] (cf. FIG. 2). When the filtering operating is operating on the error microphone signal, this filtering operation can be implemented using a programmable digital filter, analogue filter or hybrid analogue-digital filter. When the filtering operating is operating on d[k], this filtering operation may be implemented using a programmable digital filter.
- a summing unit for summing the outputs of the filtering operations $w_f$[k] and $w_b$[k]. The output signal n[k] of this summing unit represents the noise cancellation signal.
- a summing unit for summing the noise cancellation signal and the audio signal.
- a psychoacoustic filter computation unit, which computes the parameters of the filtering operations $w_f$[k] and $w_b$[k] using the spectro-temporal characteristics of the audio signal and the ambient noise, in order to mask the perception of the residual noise as well as possible by the audio signal. This psychoacoustic filter computation unit can be run independently of the real-time filtering operations, i.e. the parameters of the filtering operations can be computed off-line and then copied to the real-time execution of the feedforward and the feedback filtering operations.

An example of a block diagram of a psychoacoustic filter computation unit is depicted in FIG. 3 (for the combined feedforward-feedback configuration). It takes the audio signal v[k], the reference microphone signal x[k] and the estimated ambient noise signal d[k] as input signals, and produces the parameters of the filtering operations $w_f$[k] and $w_b$[k]. In the block diagram depicted in FIG. 3 only simultaneous masking effects (in the frequency-domain) are considered, but in addition also temporal masking effects (in the time-domain) may be exploited. According to embodiments of the herein disclosed subject matter, the psychoacoustic filter computation unit comprises one or more of

- a frequency analysis unit operating on the reference microphone signal x[k] and producing X(ω). This frequency analysis may be implemented using e.g. the discrete-time Fourier transform.
- a frequency analysis unit operating on the signal d[k] and producing D(ω). This frequency analysis may be implemented using e.g. the discrete-time Fourier transform.
- a power spectrum unit operating on D(ω) and producing $\phi_d(\omega)$.
- a digital filter s[k] operating on the audio signal. The output of this filter represents an estimate of the audio signal at the error microphone. In particular this filter however is a non-essential part and may be omitted.
- a psychoacoustic masking model unit generating the frequency masking threshold $T_v(\omega)$. The used masking model may be based on e.g. the ISO-MPEG-1 model.
- a subtraction unit subtracting the output of the power spectrum unit from the output of the psychoacoustic masking model unit, producing the desired active performance $G_{des}(\omega)$.
- additional constraints may be imposed on the desired active performance, such as minimum performance (e.g. in the low frequencies) and maximum amplification (e.g. in the high frequencies).
- a filter optimisation unit, optimising the parameters of the filtering operations $w_f$[k] and $w_b$[k] such that the actual active performance approaches the desired active performance as well as possible. Different optimisation methods can be used, e.g. using iterative weighting of the LS cost function in (15), using a non-linear optimisation method or using semidefinite programming techniques.

Further, an ANR system in a feedforward configuration does not involve a feedback filtering operation $w_b$[k]. Hence in this case, the psychoacoustic filter computation unit only needs to produce the parameters of the feedforward filtering operation $w_f$[k]

An ANR system in feedback configuration does not include a reference microphone. Hence, no filtering operation $w_f$[k] and summing unit for the output of the feedforward and feedback filtering operations are required. In addition, the psychoacoustic filter computation unit, depicted in FIG. 10, only needs to produce the parameters of the feedback filtering operation $w_b$[k] and no frequency analysis unit operating on the reference microphone signal is required.

Finally it should be noted that the herein disclosed subject matter can be used e.g. in any ANR application (e.g. headsets, mobile phone handsets, cars, hearing aids) where the loudspeaker is playing an audio signal simultaneously with the noise cancellation signal. Since the ANR filters are optimised using the spectro-temporal characteristics of the audio signal and the ambient noise, the perception of the residual noise is masked as well as possible by the audio signal.

LIST OF REFERENCE SIGNS

100, 200, 300, 400 ANR system
101 cancellation signal generator

102 loudspeaker
103*a*, 103*b* input of the cancellation signal generator
104 reference microphone
105 reference microphone signal
106 error microphone
107 error microphone signal
108 feedforward filter
109 loudspeaker signal
110 feedback filter
111 ambient noise
112 secondary path signal
114 noise cancellation signal
116 filtered reference microphone signal
118 filtered error microphone signal
120 summing unit
121 secondary path
122, 122*a* secondary path filter
124 filtered loudspeaker signal (estimate of secondary path signal)
126 ambient noise estimation signal
128 summing unit
129*a*, 129*b* filter parameter values
130, 330, 430 psychoacoustic filter computation unit
132 audio signal
134 audio source
136 summing unit
138 estimated audio signal
140 psychoacoustic masking model unit
142 frequency masking threshold
144 power spectral density (PSD) of the ambient noise
146 frequency analysator
148 transformed quantity
150 power spectrum unit
151 difference between ambient noise PSD and the masking threshold
152 summing unit
154 desired active performance
156 constraints
158, 358, 458 filter optimization unit
160 transformed quantity
162 frequency analysator
164 power spectral density of the audio signal
166 power spectral density of a first residual noise
168 power spectral density of a second residual noise
170 active performance without perceptual masking
172 active performance with perceptual masking

The invention claimed is:

1. A method of active noise reduction, the method comprising:
receiving an audio signal to be played;
receiving at least one noise signal from at least one microphone, said at least one noise signal being indicative of an ambient noise; and
generating a noise cancellation signal depending on both said audio signal and said at least one noise signal, wherein the noise cancellation signal reduces an intensity of the ambient noise in frequency regions where the ambient noise is not masked by the audio signal.

2. The method according to claim 1, wherein generating said noise cancellation signal comprises:
providing an active noise reduction filter having a plurality of filter parameters which define filter characteristics of the active noise reduction filter;
providing optimized values for said plurality of filter parameters of said active noise reduction filter depending on said audio signal and at least one said noise signal; and filtering said at least one noise signal with said active noise reduction filter by using said optimized values for said plurality of filter parameters.

3. The method according to claim 2, further comprising:
determining said optimized values for said plurality of filter parameters in an optimization procedure, said optimization procedure using spectro-temporal characteristics of said audio signal and spectro-temporal characteristics of said at least one noise signal to improve masking of a perception of residual noise by said audio signal.

4. The method according to claim 2, the method further comprising:
determining a frequency masking threshold from the audio signal;
determining a desired active performance indicating how much the ambient noise must be suppressed such that it is masked by the audio signal; and
optimizing said plurality of filter parameters so as to decrease a difference between an actual active performance and the desired active performance.

5. The method according to claim 4, further comprising:
determining said desired active performance from a difference between the frequency masking threshold and a power spectral density of said at least one noise signal.

6. The method according to claim 1, wherein said at least one noise signal is a feedforward signal obtained by receiving a reference microphone signal from a reference microphone which is configured for receiving said ambient noise and for generating in response thereto said reference microphone signal.

7. The method according to claim 1, wherein said at least one noise signal is a feedback signal obtained by receiving an error microphone signal from an error microphone which is configured for receiving said ambient noise, and a secondary path filters the noise cancellation signal between a loudspeaker and said error microphone, filters said audio signal filtered by said secondary path, and generates in response hereto said error microphone signal.

8. The method according to claim 1, wherein said at least one noise signal is an ambient noise estimation signal, obtained by subtracting an estimate of a secondary path signal from an error microphone signal, the secondary path signal is a signal received by the error microphone which corresponds to a sum of said audio signal and said noise cancellation signal, and said error microphone signal is generated by the error microphone which is configured for receiving said ambient noise, said noise cancellation signal and said audio signal, and for generating in response thereto said error microphone signal.

9. The method according to claim 1, further comprising:
considering simultaneous masking effects in a frequency domain.

10. The method according to claim 1, further comprising:
considering temporal masking effects in a time domain.

11. A cancellation signal generator comprising:
a first input configured to receive an audio signal to be played; and
a second input configured to receive, from at least one microphone, at least one noise signal indicative of an ambient noise, wherein said cancellation signal generator is configured for generating a noise cancellation signal depending on both said audio signal and said at least one noise signal, wherein the noise cancellation signal reduces an intensity of the ambient noise in frequency regions where the ambient noise is not masked by the audio signal.

12. The cancellation signal generator according to claim 11, further comprising:

a power spectrum unit configured to provide, based on said at least one noise signal, an ambient noise power spectrum density corresponding to said ambient noise;

a psychoacoustic masking model unit configured to generate, based on said audio signal, a frequency masking threshold, said frequency masking threshold indicating a power below which a residual noise is masked by the audio signal; and a subtraction unit configured to calculate, as a desired active performance, a difference of said ambient noise power spectrum density and said frequency masking threshold.

13. The cancellation signal generator according to claim 11, further comprising:

an active noise reduction filter having filter characteristics depending on both said audio signal and said at least one noise signal, wherein said active noise reduction filter is configured to filter said at least one noise signal to thereby generate said noise cancellation signal.

14. The cancellation signal generator according to claim 13, further comprising:

said active noise reduction filter having a plurality of filter parameters which define said filter characteristics of the active noise reduction filter, and a filter optimization unit configured for providing optimized values for said filter parameters of said active noise reduction filter depending on said audio signal and said at least one noise signal.

15. An active noise reduction audio system comprising:

the cancellation signal generator according to claim 11;

a loudspeaker for playing said audio signal; and said at least one microphone for providing said at least one noise signal.

* * * * *